(12) United States Patent
Pendergraft (10) Patent No.: US 7,102,512 B2
(45) Date of Patent: Sep. 5, 2006

(54) MOBILE SECURITY UNIT

(75) Inventor: David R. Pendergraft, Manassas, VA (US)

(73) Assignee: Accenture Global Services GmbH, Schaffhausen (CH)

( * ) Notice: Subject to any disclaimer, the term of this patent is extended or adjusted under 35 U.S.C. 154(b) by 357 days.

(21) Appl. No.: 10/679,509

(22) Filed: Oct. 7, 2003

(65) Prior Publication Data

US 2005/0074086 A1 Apr. 7, 2005

(51) Int. Cl.
*G08B 21/00* (2006.01)

(52) U.S. Cl. ............... 340/540; 340/551; 340/552; 340/561

(58) Field of Classification Search ............ 340/540, 340/551, 552, 561
See application file for complete search history.

(56) References Cited

U.S. PATENT DOCUMENTS

| | | | |
|---|---|---|---|
| 6,057,761 A * | 5/2000 | Yukl ............... | 340/568.1 |
| 6,484,650 B1 * | 11/2002 | Stomski ............... | 109/6 |
| 6,507,278 B1 * | 1/2003 | Brunetti et al. ............ | 340/541 |
| 6,724,304 B1 * | 4/2004 | Risi ............... | 340/540 |
| 2003/0213184 A1 * | 11/2003 | Hunt et al. ............ | 52/36.1 |
| 2004/0232054 A1 * | 11/2004 | Brown et al. ............ | 209/552 |
| 2005/0057354 A1 * | 3/2005 | Jenkins et al. ............ | 340/522 |

* cited by examiner

*Primary Examiner*—Jeffery Hofsass
*Assistant Examiner*—Samuel J. Walk
(74) *Attorney, Agent, or Firm*—Hogan & Hartson LLP (57) ABSTRACT

A Mobile Security Unit (MSU) has a security checkpoint and a transport. The security checkpoint has an item screening area and a personal screening area. The checkpoint is configured as needed to fit within the transport. The MSU may further separate certain individuals into a secure, enclosed wanding station for additional security screening. The wanding station may be constructed using glass (or other strong, visually transparent substance) and metallic (such as aluminum or steel) posts so that people may be securely enclosed in the wanding station but still have a direct line of sight to personal items being screened at another location. The MSU is configured so that most people pass straight through the checkpoint, and people leaving the wanding station can easily obtain their items without delaying others.

17 Claims, 7 Drawing Sheets

Fig. 1

PRIOR ART

Fig. 2A

PRIOR ART

Fig. 2B

PRIOR ART

Fig. 2C

PRIOR ART

Fig. 2D

PRIOR ART

MOBILE SECURITY UNIT

CROSS REFERENCE TO RELATED APPLICATIONS

Not Applicable.

SPONSORED RESEARCH OR DEVELOPMENT

Not Applicable.

SEQUENCE LISTINGS

Not Applicable.

BACKGROUND OF THE INVENTION

1. Field of the Invention

The present invention provides a mobile security checkpoint configuration that processes people efficiently, improves public satisfaction, and provides improved security.

2. Discussion of the Related Art

Security measures allow the public to continue to live normal lives in an increasingly dangerous world. Because of the increasing dangers, security precautions are becoming common aspects of modern life. For example, security checkpoints at airports and other public locations provide increased safety to the public through the screening, location, and collection of harmful items, thereby helping to prevent the presence of these harmful items in the public locations. In exchange for this increased safety, the public trades inconvenience and a loss of privacy.

Also, the security checkpoints are relatively expensive to construct and staff. While the public is generally not charged for the use of security checkpoints, the costs for the security procedures are passed to the public in the form of higher costs. A security checkpoint typically employs expensive screening equipment, such as an x-ray device, a walk through metal detector (WTMD), and/or a handheld metal detector (HHMD). As the need for security increases, the security checkpoints increasingly include more precise versions of the screening devices and new types of equipment (such as a chemical trace detection device that detects the presences of contraband chemicals on a person or item). The staffing of the security checkpoint may also have high costs, since the checkpoint must be adequately staffed as needed for safety and desired checkpoint throughput. Furthermore, with the above-described use of new security equipment and with a desire for increased security, training and qualification requirements for the security workers are increasing.

To help ensure the general acceptance of security checkpoints, the checkpoints should minimize the costs to the public. Various performance measures quantify these costs to the public. For instance, the delay time associated with a checkpoint may be measured, and the security checkpoint may be modified to minimize the delays.

Security checkpoint configurations typically suffer from several disadvantages. Primarily, the conventional checkpoint may not process the public with optimal efficiency. Because of resulting delays, the public is frequently dissatisfied with the conventional security checkpoint configurations. Even if the delays associated with a checkpoint are minimal, the checkpoint may cause public dissatisfaction for unnecessary delays and for the perception of unnecessary delays.

Furthermore, establishing security checkpoints at certain locations, such as seaports or outdoor public venues, raises several problems. Many locations need security checkpoints only intermittently. For example, passenger ships typically depart from a seaport perhaps once or twice per week. In the same way, large public venues, such as an outdoor sports facility, typically host a few events per week. Thus, a security checkpoint at these locations, despite having relatively high constructing and staffing costs, sits idle most of the time.

At the same time, these checkpoints often need to be configured to process a large number of people in a relatively short period. For example, a large number of passengers may need to board a ship in a short time at a seaport. Similarly, a public venue may need to process and admit a large number of people before the start of an event, such as a music concert or sport contest. If the security checkpoints are too small or understaffed, excessive delays may result in processing the large number of people, causing public dissatisfaction. For example, excessive delays at the public venues may cause ticket-holders to miss all or part of an event. Thus, the security checkpoints at these locations, despite their infrequent use, often need to be configured and staffed to process a large number of people in a short time period. The checkpoint consequently needs to be sufficiently staffed and include sufficient equipment to achieve the desired throughput, further increasing the costs for the checkpoints.

Even checkpoints that are used more frequently, such as those located in airports, face wildly fluctuating demand levels. For instance, significantly larger numbers of people travel through the airport (and thus must pass through the checkpoints) at certain days (such as holidays) or seasons (such as summer travel to ocean resorts). Thus, excessive lines and delays may occur at these checkpoints during these periods of high demand. Configuring the checkpoint to meet the higher checkpoint demand during these period results in increased costs, as described above.

Security checkpoints in outdoor locations face other challenges. As described above, the equipment used in the checkpoints is relatively expensive. Furthermore the performance and accuracy of the security equipment tends to be quite sensitive to environmental factors such as moisture. Also, contact with the environment may quickly damage or destroy the expensive search equipment, especially harsh environments surrounding certain areas, such as seaports. Furthermore, even if expansion of a checkpoint is desired, a location may lack sufficient space to accommodate the additional security equipment and workers.

BRIEF SUMMARY OF THE INVENTION

The present invention provides a Mobile Security Unit (MSU) having a security checkpoint and a transport. The security checkpoint has an item screening area and a personal screening area. The equipment in the item and personal screening areas are selected as needed for the security checkpoint. The checkpoint may be configured as needed to fit within the transport.

In one embodiment, the MSU separates flagged individuals for further searching, apart from their possessions and other people. These identified people are led to a secure, enclosed area, hereafter referred to as a wanding station. The wanding station is an area physically separated from personal and item screening areas. This design comfortably contains dirty people (e.g., those that raise an alarm when passing through a metal detector) and prevents these people from interacting with other people or retrieving their items until completion of the personal screening. Thus, the present invention has the benefit of lessening the chance of a security breech by containing people within the enclosed wanding station until they are cleared.

The present invention has the further benefit of controlling the flow of traffic through the checkpoint and, thus, lessening the above described, undesired mingling at the security checkpoint. In this way, the present invention has the added benefit of lessening delays to most people (those not selected for further searching) by allowing them to quickly pass through the checkpoint without waiting for the additional screening of others.

As described above, the wanding station is a unique physical structure for separating and holding people during the additional screenings. Ropes between stanchions or other movable barriers may form the wanding station. In a preferred embodiment, the wanding station is constructed using glass (or another strong, visually transparent substance) and metallic (such as aluminum or steel) posts so that people may be securely enclosed in the wanding station but still have a direct line of sight to personal items being screened at another location on an x-ray belt.

The size of the wanding station may vary according to the needs of the checkpoint, provided that the wanding station has sufficient room for the additional screening. In one implementation, the wanding station is dimensioned to provide adequate space within the wanding station for two people to be screened by security personnel at the same time.

If the wanding station is filled to capacity, the security checkpoint module may close to prevent more people from entering the wanding station. To minimize the frequency of closings of the security checkpoint module, a preferred embodiment of the wanding station includes an entry area in which people form an entry queue to the wanding station. This design increases passenger throughput through the checkpoint by increasing the number of the people separated toward the wanding station before impeding the throughput the personal screening area. In a particular implementation, the entry area (or neck) is designed to hold two passengers.

Another embodiment of the present invention provides a security checkpoint configuration that uses specific positioning and dimensions of the security equipment to improve the throughput of the checkpoint. Specifically, the MSU is designed to ensure that the people that do not cause an alarm, who comprise a majority of people passing through the security checkpoint, can quickly and easily proceed from a walkthrough metal detector straight through to the x-ray machine, obtain their bags from the rollers and proceed with minimal delay. To achieve this goal, the walk through metal detector is positioned close to an x-ray unit. The mobile security unit of the present invention is also preferably configured so that people leaving the wanding station can easily obtain their items without delaying others. Specifically, a person exits the wanding station after an alarm is cleared and move directly to retrieve her items. To facilitate this design, a roller extension to the x-ray machine (for screening items) may be employed to provide the additional length as needed to prevent the people from having to walk upstream, against the flow of other people.

BRIEF DESCRIPTION OF THE DRAWINGS

These and other advantages of the present invention are described more fully in the following drawings and accompanying text in which like reference numbers represent corresponding parts throughout.

DETAILED DESCRIPTION OF THE PREFERRED EMBODIMENTS

Figure 1:
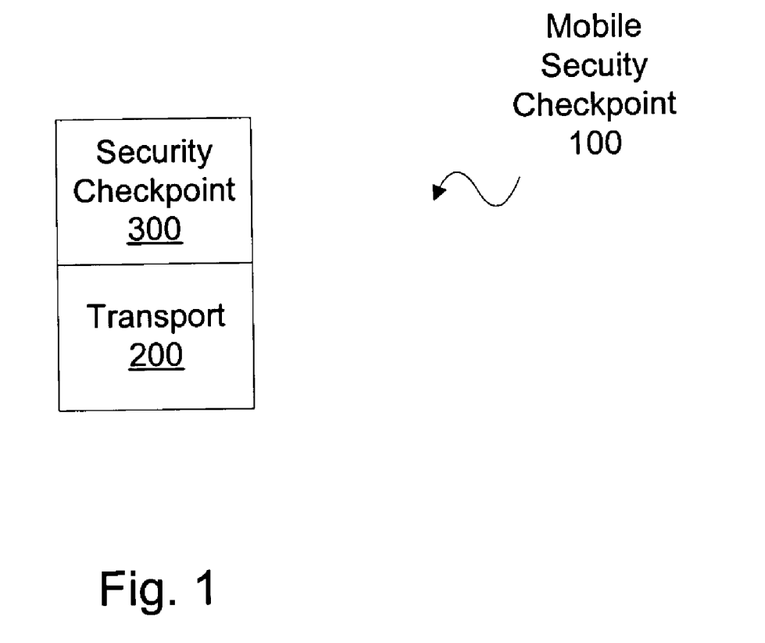
FIG. 1 is a schematic illustration of a mobile security unit in accordance with an embodiment of the present invention.

A mobile security unit (MSU) 100 having a transport 200 configured to move a security checkpoint 300, as schematically depicted in FIG. 1. The MSU 100 may then be moved as needed to meet security demand or to store the security checkpoint, as described above. Specifically, one or more of the MSUs 100 may be moved to a location having a temporary security demand and removed after the demand abates. The MSU 100 may then be placed into storage during a period of inactivity. In this way, delicate screening equipment on the MSU 100 may be protected during periods of inactivity. Alternatively, the MSU 100 may be repositioned to another location of greater security demand. In this way, the security checkpoint assets may be distributed between different locations in an efficient manner. Similarly, the costs for security may be shared between different locations.

Figure 2A:
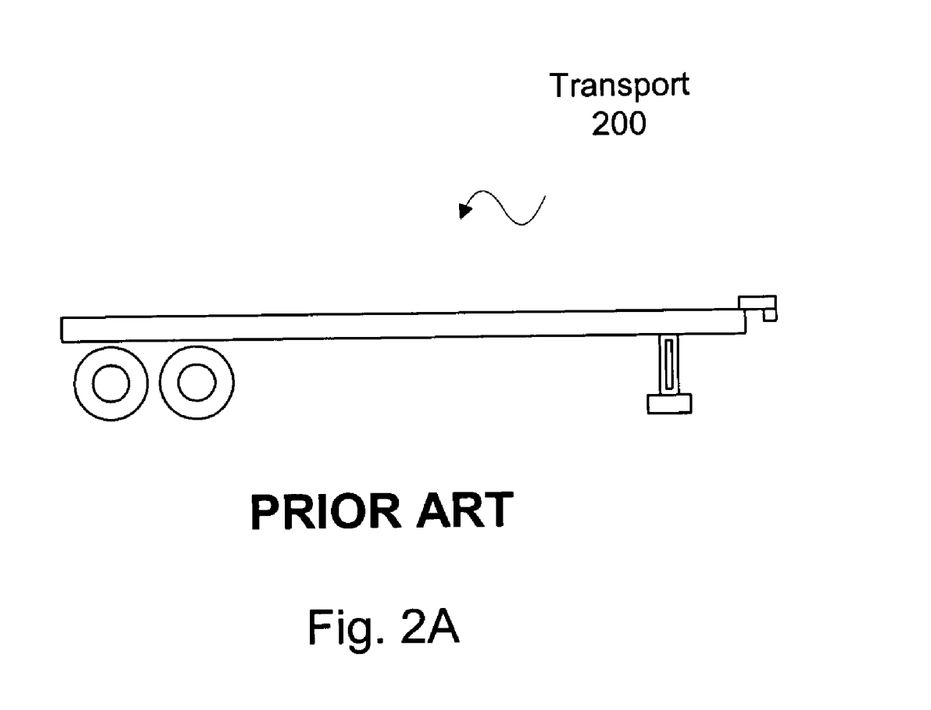
FIG. 2A-2E are illustrations of a transport in accordance with embodiments of the mobile security unit of the present invention.
Figure 2B:
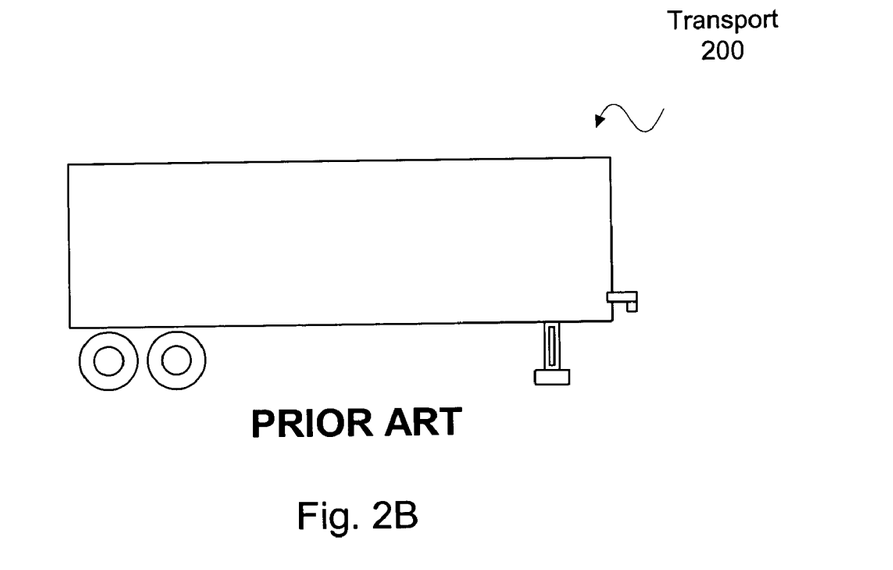
Figure 2C:
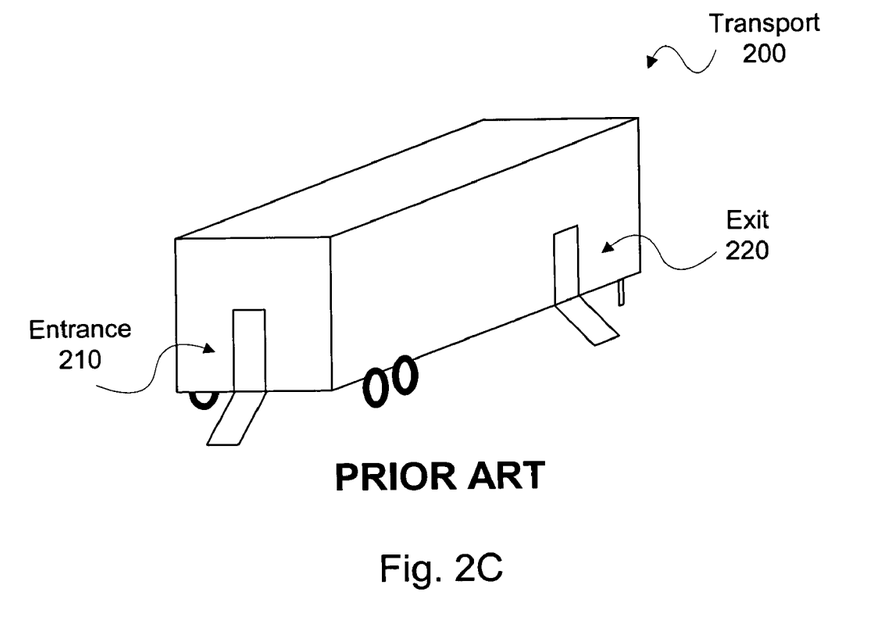

Referring now to FIGS. 2A and 2B, the transport 200 may be some type movable structure for carrying the security screening equipment. Because some of the screening devices are typically large and heavy objects, the transport 200 is typically a movable trailer that can be towed by a trailer, truck, bus or other sort of mechanized vehicle. As depicted in FIGS. 2B and 2C, the transport 200 generally includes an enclosure around the security checkpoint 300 to protect the security equipment from environmental factors.

As seen in FIG. 2C, the enclosed transport 200 housing the security checkpoint 300 may include an entrance 210 and an exit 220. In this way, the flow of traffic through the MSU 100 may be controlled. Furthermore, the MSU 100 may be positioned so that people must pass enter the entrance 210 and pass through though the security checkpoint 300, before exiting MSU 100 via the exit 220 positioned within a secure enclosure (not illustrated). Because the transport 200 is raised, the entrance 210 and the exit 220 may include some type of ramp or stairs assembly, as suggested in FIG. 2C, to assist people with ingress to and egress from the MSU 100. The entrance 210 and exit 220 may also be configured as needed to provide desired levels of handicap access. For instance, the entrance 210 may be ramp or elevator of sufficient width to provide wheelchair access.

Figure 2D:
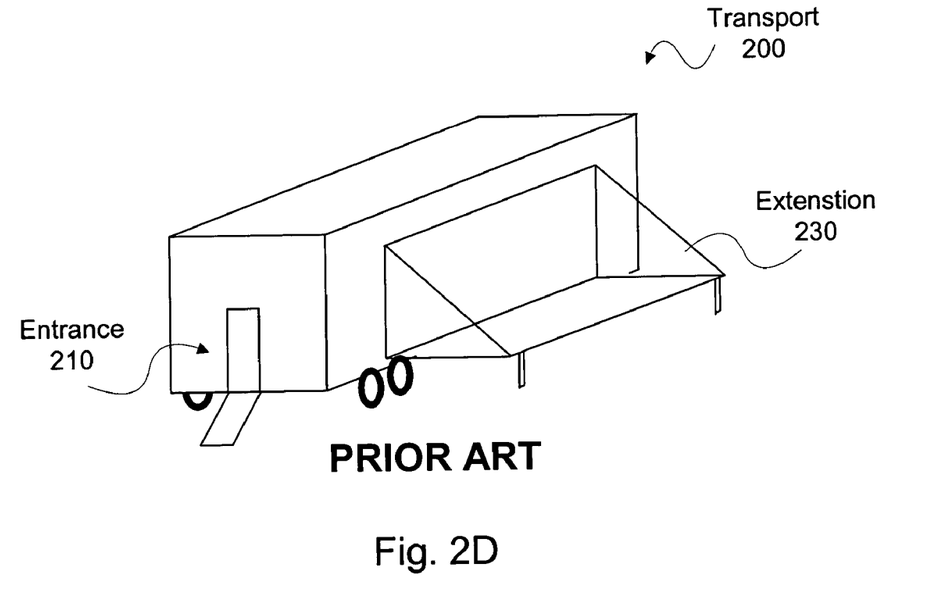
Figure 2E:
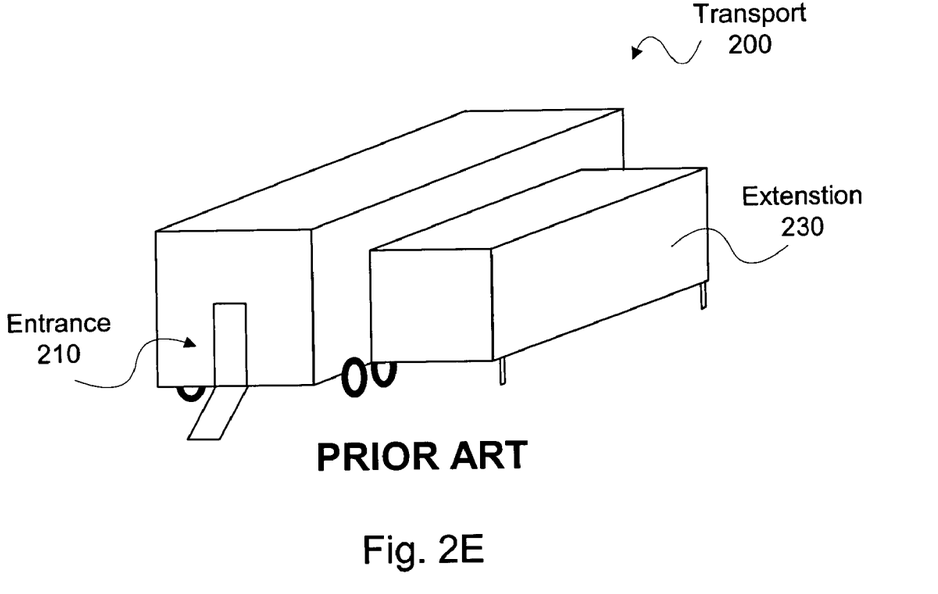

Turning now to FIGS. 2D and 2E, the transport 200 may include some type of extension 230 to expand the space for the security checkpoint within the enclosure. For instance, FIG. 2D depicts include a fold-down extension 300 that opens up the interior of the transport 200. Alternatively, FIG. 2E depicts a nested structure or an accordion-type extension 300 that expands the interior of the transport 200. These and other types of transport extension are well known in the field of specialty vehicles and transports.

However, it should be appreciated that any type of transport 200 may be used and adapted as needed for the security checkpoint 300. For instance, the transport may include some type of climate control system (heat and/or air conditioning) if desired to improve the performance of screening equipment. Similarly, the transport may be configured, to the extent allowed by state and federal rules, as needed to accommodate the needs of the security checkpoint.

Figure 3A:
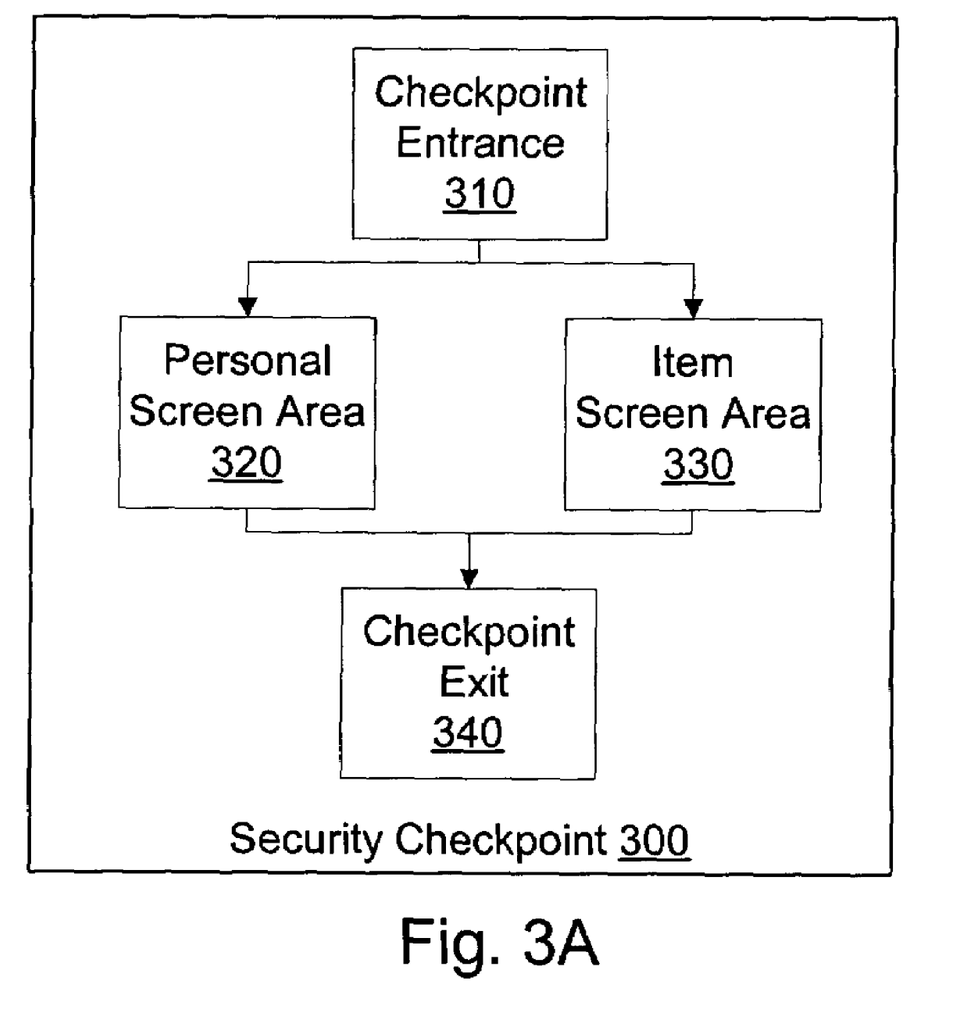
FIGS. 3A–3B are schematic illustrations of a security checkpoint in accordance with embodiments of the mobile security unit of the present invention.

Turning now to FIG. 3A that schematically depicts a security checkpoint 300, people enter via a checkpoint entrance 310 where they generally prepare for screening before entering a personal screening area 320. In the checkpoint entrance 310, the people also place any baggage and items into an item screen area 330. After completion of the personal and item screens, the people recollect their items and leave the security checkpoint through a checkpoint exit 340.

First, a person enters the security checkpoint entrance 310. In some instances, only people having a ticket are allowed to enter the security checkpoint 300. Thus, one aspect of the checkpoint entrance 310 may be an examination of tickets. The checkpoint entrance 310 may further include gates, doors or other structures to prevent people from bypassing the MSU 100.

In the security checkpoint entrance 310, people prepare for personal and item screening, described below. For instance, people in the security checkpoint entrance 310 prepare for screening in the personal screen area 320 by removing keys, coins, jewelry, cell phones or other metallic objects that may interfere with security examinations. Similarly, people in the security entrance 310 prepare for item screening in item screening area 330 by placing items into the item screening area 330 and by identifying special items, such a laptop computer or camera equipment, that require separate searching.

In the personal screen area 320, a person is screened by some type of rapid scanning device, such as a walk through metal detector (WTMD). Certain people activate an alarm, thereby requiring resolution of the personal screen alarm. Increasing the sensitivity of the personal screening device increases the percentage of people that activate the alarm.

A personal screen alarm is resolved before the person can leave the checkpoint 300. The person causing the alarm may return to the checkpoint entrance 310, remove one or more items, and re-enter the personal screen area 320 to repeat the screening. Alternatively, security workers may close the personal screening area 320 and perform other screening tests as needed to resolve the alarm. For example, the security workers may use a hand-held metal detector ("HHMD") or other screening techniques (such as a frisk) to identify objects causing the alarm. Unfortunately, these processes delay other people waiting to enter the personal screening area 320.

Returning to FIG. 3A, a person initiates the item screening in item screening area 330 by placing an item into the item screening area 330. The item is then screened using known technology. Typically, the item screening uses some type of x-ray device that allows security officials to see into the item. If the x-ray device produces an alarm, then the alarm must be resolved through more detailed screening before that item is allowed through the security checkpoint. After the item screening alarm is resolved or if the item did not produce an item screening alarm, the item may be cleared and the item screening ends.

The resolving of the item screen alarm in the item screening area generally entails a more thorough examination of the item, as necessary for the security checkpoint of interest. For instance, in an airport, security officials may test the item for presence of prohibited chemicals. If needed, the security officials may also manually search the item to identify the cause for the alarm. It should be appreciated that other security tasks or combinations of tasks may be incorporated as well. Also, the extent of the manual search may vary according to the results of the x-ray. Specifically, the manual search may vary depending on whether a restricted item is seen during screening.

The screening of a person's items in area 330 and screening of the person in area 320 occur concurrently to expedite the security process. However, as suggested above, the item screening in area 330 and personal screening in area 320 may be interrelated so that tasks in one of the areas cannot begin until the completion of a task in the other area. In this way, delays in both areas 320 and 330 may occur with a person causing a security alarm in the personal screening area 320. For instance, more extensive screens (such as a manual search) of an item in area 330 generally cannot begin without the presence of the owner. As a result, delays may occur in the item screen area 330 if the owner is detained in the personal screen area 320.

Upon completion of both the item and personal screens, people collect their items and leave the security checkpoint through the security checkpoint exit 340. The checkpoint exit 340 may further include gate, doors, or other structures to prevent people from entering the checkpoint 300 from the exit 340.

This configuration 300 depicted in FIG. 3A may have several deficiencies, including potentially mixing people who pass and fail the personal screening and allowing people to access items in the item screen area before completing a personal screen. Thus, a potential security risk arises in which a person may stow contraband on to cleared people or baggage. Also, the configuration of the security checkpoint 300 may cause delays because additional searching of people in the personal screen area 320 prevent others from entering the area and potentially delays item screening in area 330.

Figure 3B:
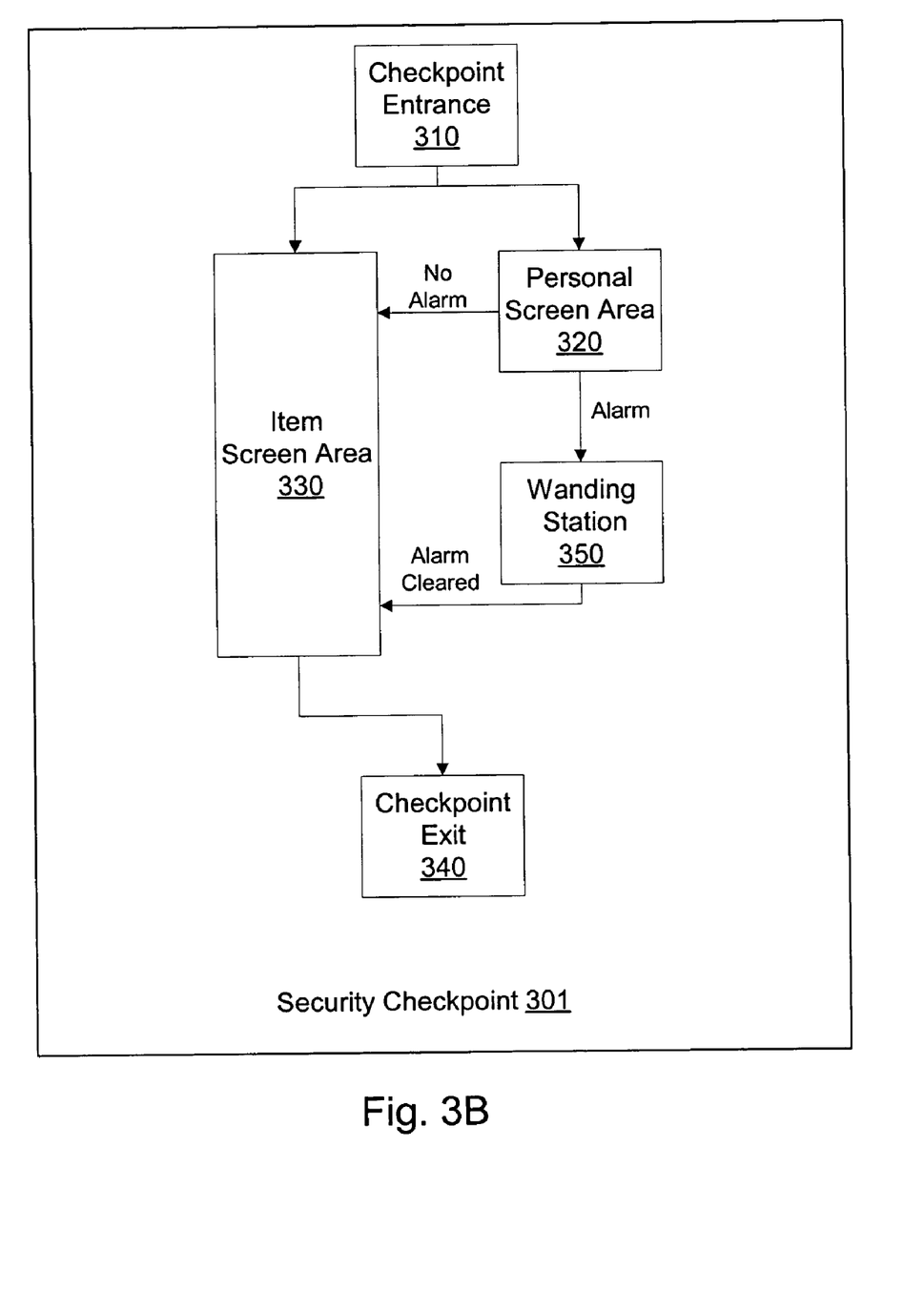

In response to these deficiencies, the present invention may include an improved security checkpoint 301 schematically depicted in FIG. 3B. As with the security checkpoint module 300, the improved security checkpoint 301 directs people to enter a checkpoint module entrance 310 where they generally prepare for personal and item screening in areas 320 and 330, respectively, and then leave the checkpoint through the checkpoint exit 340, as described above.

It should be appreciated that the screening devices and tests used in the areas 320 and 330 may vary as needed for security checkpoint 300 and the improved security checkpoint 301, and such changes are anticipated by and easily incorporated into the present invention.

Continuing with FIG. 3B, the improved security checkpoint 301 includes a wanding station 350 to address the deficiencies in the security checkpoint module 300. The wanding station 350 is separate from the personal screen area 320 and the item screen area 330. Specifically, people selected for a further search in the personal screening area 320 (i.e., those activating an alarm by a metal detector) are directed toward the wanding station 350. In this way, the improved security checkpoint 301 avoids the problems associated with a chaotic screening process. Furthermore, because the additional screening occurs in the wanding station 350, away from the personal screening area 320, other people passing through the personal screen area 320 are not significantly affected by the additional screening.

In particular, when a person causes a personal screening alarm in area 320, that person is moved to the secure wanding station 350 for more extensive searches, as needed to resolve the alarm. The resolving of the personal screen alarm in the wanding station 350 may vary depending on the needs of the security checkpoint 301. For instance, the alarm may be resolved through a hand-held metal detector (HHMD) search or other tests to identify the cause for the personal screen alarm.

The wanding station 350 may be any type of enclosed area designated for further personal screening within the MSU 100. For instance, the wanding station 350 is a structure constructed according to the needs and resources present at the security checkpoint. In one implementation, the screening devices present in the MSU 100 (i.e., the above described WTMD and the x-ray machine) may be positioned to form an enclosure for the wanding station 350. In a similar way, the wanding station 350 may be an enclosure defined by stanchions connected by ropes, chains, or retractable tape. Security workers in the wanding station help to ensure that a person cannot leave the wanding station 350 until cleared.

Alternatively, the wanding station may be positioned externally from the MSU 100. For instance, people specified by the various screen devices people or otherwise selected for additional screening may be escorted out of the MSU 100 into the wanding area 350 located in a separate secure area. Additional security screening may then occur in the wanding area 350, as suggested above.

Figure 4:
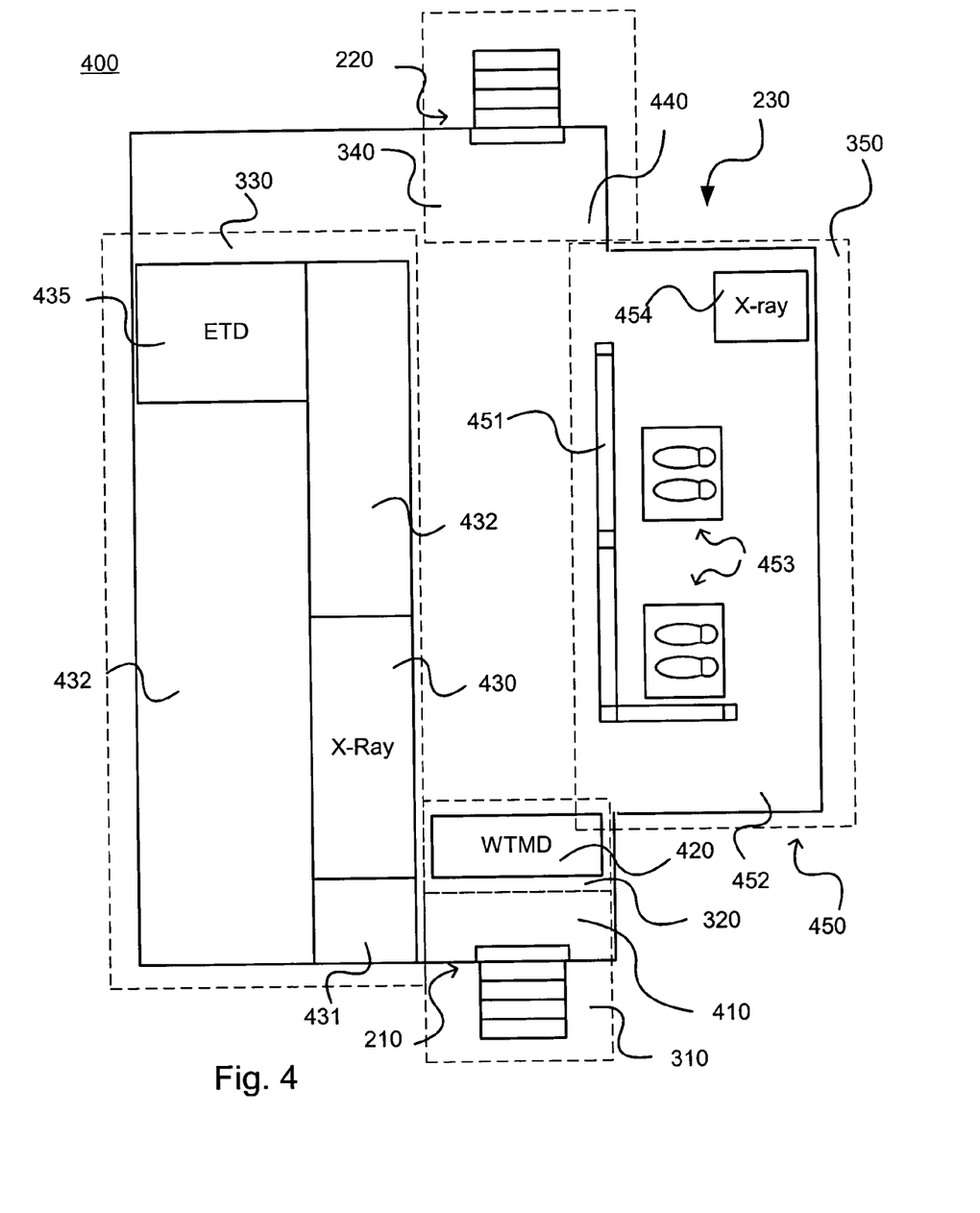
FIG. 4 is illustrates a configuration of a mobile security unit in accordance with embodiments of the present invention depicted in FIG. 3B.

Turning now to FIG. 4, some of the specific elements of an exemplary MSU 400 are illustrated. Specifically, the exemplary MSU 400 includes a wanding station 450 enclosed in glass or other sturdy materials constructed within the transport extension 230, as described above.

The exemplary MSU 400 includes an x-ray machine 430, an x-ray roller extension 432, a small item scanner 454, a Walk-Through-Metal Detectors (WTMD) 420, an Electronic Trace Detection (ETD) machine 434, and the wanding station 450. It should be appreciated that any type or combination screening devices may be used in the MSU 100, according to the security needs.

In one implementation, the exemplary MSU 400 may use six security workers for efficient operation, including: (1) an entrance monitor; (2) a WTMD operator stationed on the exit side of the WTMD 420; (3) an x-ray Operator stationed at the x-ray monitor station 430; (4) two Wand Operators stationed inside the wanding station 450; (5) a Bag Searcher and ETD Operator stationed behind the ETD station 434; and (6) an exit monitor.

The wanding area 450 (corresponding to above described wanding area 350) is defined by a structure 451 that may be formed using the frame elements 446 form a skeleton for securing the wanding station walls 445. The wanding area 450 is also depicted with wanding substations 453 and an entry area 452.

Continuing with FIG. 4, the exemplary MSU may be configured to improve its efficiency. For instance, the WTMD 420 should be positioned in relation to the x-ray device 430 so that provide most people (i.e., those not selected for further screening in the wanding station 450) a direct, straight walkway to proceed directly to collect their items at the end of the x-ray lane 430. Also, the x-ray lanes 430 may have extenders 432 so that people leaving the wanding station 450 may proceed directly to their items without traveling upstream, against the flow of other people, to recover the items from the item screen area 330. The extenders 432 may be a set of rollers, a moving conveyer belt, or some other type of known structure for receiving items from the x-ray 430 and transporting these items to a desired location, generally near the exit to the wanding station 450. In addition, efficiency of checkpoint is improved because the composure bottleneck is dispersed along the entire length of the extenders 432.

Returning to FIG. 4, the wanding station 450 may be dimensioned as allowed in the MSU 400. Also, the wanding station 450 may be dimensioned as needed for the security checkpoint. For example, detailed modeling and simulations may be used to determine a wanding station size and capacity as needed achieve adequate throughput through the MSU 400. FIG. 4 depicts a wanding station 450 having two substations 453 for simultaneously screening two people. The substations 453 are depicted as wanding footpads that guide people to proper positions for screening in the wanding station 450. It should be appreciated that the wanding station 450 may be any other size as needed for a particular security checkpoint 300. Specifically, the wanding station 450 may be shaped and dimensioned according to the available space within the transport 200. Furthermore, the size of the wanding station 450 (and the corresponding capacity) may be modified according to the desired throughput of the security checkpoint module.

When the wanding station 450 is filled to capacity, the MSU 400 closes until the completion of the screening of at least one of the substations 453. Otherwise, a person causing an alarm in the personal screening area 420 has nowhere to go and becomes a potential security risk. To increase the capacity of the wanding station 450 and, thus, minimize the closings of the MSU 400, the wanding station 450 may further include an entry area (or neck) 452 in which passengers form a queue for entering the wanding station 450, as depicted in FIG. 4. In a particular implementation, the neck 252 may be sized to hold two people, thus doubling the number of people in wanding station 450 before necessitating closing the MSU 400.

The wanding station 450 is optimally sized according to space limitations and capacity needs of the checkpoint. As a result, additional security test equipment to improve the efficiency and/or thoroughness of the screening may be positioned within or outside of the wanding station. For example, FIG. 4 depicts a small-item scanner machine 454 positioned within the wanding station 440. The small item scanner 454 allows security workers to screen small personal items, such as shoes and coats, relatively quickly. This screening functionality speeds the screening of a person spends in the Wanding Station 450 by having personal items scanned concurrently with other personal screenings.

Figure 5:
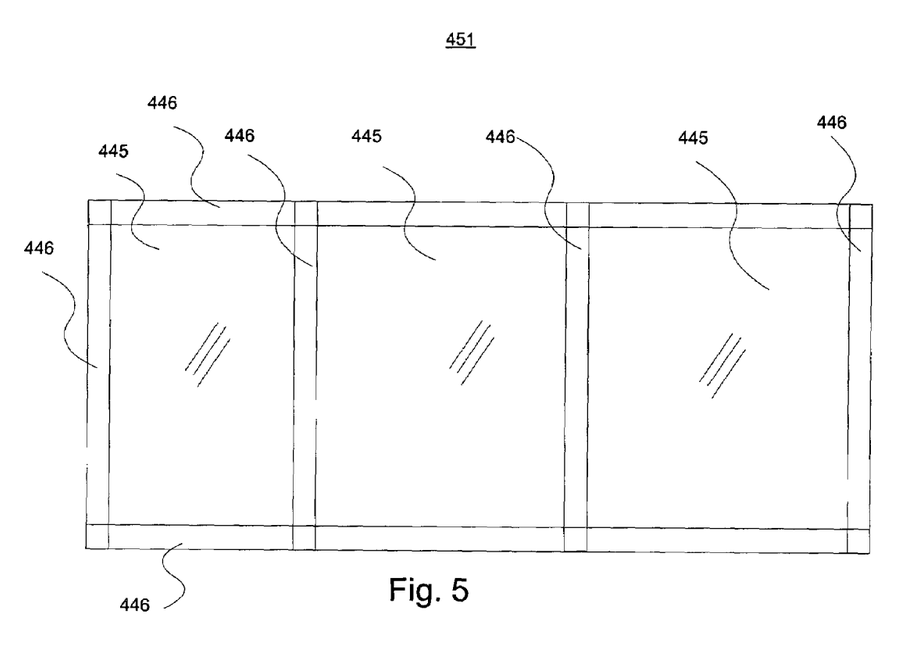
FIG. 5 depicts a side view of an enclosure defining the wanding area of the mobile security unit illustrated in FIG. 4.

FIG. 5 depicts a structure 451 for forming the wanding station 450 in accordance with a preferred embodiment of the present invention. In particular, the wanding station 450 is formed using frame elements 456 adapted to secure wanding station walls 455. The frame elements 456 may be any type of structure that is strong enough to reliably secure the wanding station walls 455. For instance, the frame elements 456 may be metal beams or tubes to which the wanding station walls 455 are fastened. The frame elements 456 are secured to one another to form a strong structure for containing people during the additional personal screening. In the same way, the wanding station walls 455 may be any type of substantially planar structure that combines with frame elements 241 to form the desired enclosure structure. For instance, the wanding station walls 455 may be wood, metal, or plastic boards fastened to the frame elements 456.

In a preferred embodiment, the wanding station walls 455 are substantially clear to allow people in the wanding station 450 to observe the item screening area 430. In this way, people in the wanding station 450 can track their items and alert security officials if an item is mistakenly claimed or stolen. A see-through wanding station 450 also allows security workers to observe events within the wanding station 450 and to act as needed for security purposes. Accordingly, the wanding station walls 455 may be constructed from glass, a clear plastic (such as Plexiglas®), or other substantially transparent substance.

FIG. 5 depicts the structure 451 of the wanding station 450 from a side view. As described above, the frame elements 446 form a skeleton for securing the wanding station walls 445. Furthermore, the frame elements 446 and the wanding walls 445 are positioned as needed to form a structure 451 of desired dimensions and to form the components of the wanding area 450, such as the above-described neck area 452.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A security checkpoint comprising:
   a transport device; and
   at least one checkpoint module contained on said transport, the module comprising:
   an item screening area including an input area that receives an item deposited by a person,
   an item screening device that screens the item,
   a output area that returns the item to the person after completion of a first and a second personal screenings,
   a personal screening area positioned adjacent to the item screening area, wherein the person entering the personal screening area after depositing the item in the input area, the personal screening area performing the first personal screening to determine whether to perform the second personal screening, the person leaving the personal screening area and retrieving the item from the output area in a substantially straight path if the second personal screening is not performed
   an enclosure, the enclosure being physically separated from the item screening area and the personal screening area, wherein the person leaves the personal screening area and enters the enclosure if the first personal screening indicates a need to perform the second personal screening, the second personal screening occurring in the enclosure, and
   a small item screening device that assists in the second personal screening.

2. The security checkpoint of claim 1, wherein the enclosure includes an exit, and the exit is positioned proximately to the output area in the item screening area.

3. The security checkpoint of claim 2, wherein the item screening area comprises an extension connecting the item screening device and the output area.

4. The security checkpoint of claim 1, wherein the enclosure comprises a substantially transparent planer surface.

5. The security checkpoint of claim 1, wherein the enclosure comprises an entry area in which a queue may form if the enclosure is full.

6. The security checkpoint of claim 1, wherein the enclosure further comprises a wanding footpad that guides the person to a proper position for the second personal screening.

7. A mobile security checkpoint comprising:
   an item screening device, said item screening device scanning one or more of a person's items, said item screening device including an input end for inserting said items and an output end for receiving the items from the item screening device;
   a personal screening device for screening the person, wherein the personal screening device produces an alarm if the personal screening device detects a need for further screening of the person;
   an enclosure for holding the person for further screening if the personal screening device produces an alarm, wherein the enclosure is physically separated from the personal screening device and the item screening device;
   a small item screening device, said small item screening device positioned to receive and screen personal items from the enclosure; and
   a transport for containing and moving said item screening device and said personal screening device.

8. The mobile security checkpoint of claim 7, wherein the enclosure is surrounded by a wall comprising support beams and planer wall units fastened to the support beams.

9. The mobile security checkpoint of claim 8, wherein said planer wall units are substantially transparent and wherein the person, when in the enclosure, can view the item in the item screening device.

10. The mobile security checkpoint of claim 8, wherein the enclosure includes an entry area and wherein the entry area is adapted to allow for formation of a queue for entering the enclosure.

11. The mobile security checkpoint of claim 10, wherein the entry area is adapted to allow two people may join the queue before filling the entry area.

12. The mobile security checkpoint of claim 8, wherein an exit to the enclosure is positioned to allow the person to leave the enclosure and collect items from the item screening device without traveling upstream against other people.

13. The mobile security checkpoint of claim 12, wherein the item screening device includes an extender that positions the item leaving the item screening device next to the enclosure exit.

14. The mobile security checkpoint of claim 7, wherein the enclosure comprises an entrance, wherein the entrance is positioned proximately to the personal screening device.

15. The mobile security checkpoint of claim 7, wherein the item screening device, the personal screening device, and the enclosure are configured such that, if the personal screening device does not produce an alarm, the person may place the item into the item screening device, pass through the personal screening device, and retrieve the item from the item screening device in a substantially straight path.

16. The mobile security checkpoint of claim 7, wherein the enclosure is configured for simultaneously screening of two people.

17. The mobile security checkpoint of claim 7 further comprising an entrance in the transport, the entrance being configured to direct people to the personal screening device.

* * * * *